United States Patent [19]
Tamiz

[11] 4,019,030

[45] Apr. 19, 1977

[54] STEP-COUNTING SHOE

[76] Inventor: Farouq M. Tamiz, 530 Howard St., Alhambra, Calif. 91801

[22] Filed: Nov. 3, 1975

[21] Appl. No.: 627,897

[52] U.S. Cl. .............................. 235/105; 36/34 R; 36/136

[51] Int. Cl.² ................. G01C 22/00; A43B 19/00

[58] Field of Search .............. 235/105, 1 C, 91 R; 36/34 R, 83, 136

[56] References Cited

UNITED STATES PATENTS 542,107  7/1895  Reinisch et al. ................... 235/105

FOREIGN PATENTS OR APPLICATIONS 4,438  12/1891  Switzerland ...................... 235/105

Primary Examiner—Stanley J. Witkowski
Attorney, Agent, or Firm—Donald Diamond

[57] ABSTRACT

A device for the recording of the number of steps taken by a pedestrian incorporates a digital incremental counter in the heel — or attached to the heel — of a shoe. An operating member projects below the heel and initiates actuation of the counter each time the heel is brought into contact with the ground. Reading the digital display at the beginning and at the end of a stage in a trip yields the number of steps taken and a rough measure of the distance traversed. A reset lever or button may also be provided to zero the display at the start of the measurement cycle.

7 Claims, 5 Drawing Figures

STEP-COUNTING SHOE

BACKGROUND OF THE INVENTION

This invention relates to pedometers and, more particularly, to step-counting devices attached directly to a shoe.

The history of distance determination by counting the number of steps taken along a route can be traced back to the beginnings of recorded history. The statute mile, the common measure of substantial distances, is a direct descendant of the Roman military measure of 1,000 (mille) marching double-steps and its length of 5,280 feet records the commonly observed fact tht the average stride of an adult male is of the order of 30 inches, or 2½ feet.

The prior art records many pedometers which have been developed to mechanize the counting of steps and relieve the walker of the need to keep track continuously of the distance travelled. Such pedometers, as they are commonly known, generally rely on a counter assembly attached to the shank of the user, or mounted on a walking stick. Wheeled distance measuring tools are also known and can be pushed or trailed by pedestrians, but they are inconvenient and in general use only for special purposes, such as the measurement of short distances by law enforcement agents investigating automobile accidents.

Leg-mounted pedometers, the type requiring the least effort by the user, are still bulky and heavy — especially since they generally rely on a pendulum bob as the counting reference — as well as unsightly. No device of the prior art enables the user to record his steps unobtrusively and without muscle effort.

It is, therefore, the primary object of the invention to provide a stepometer which can be directly attached to, or built into, the heel of a common walking shoe, and which utilizes motions and forces already integral to the walking process itself.

It is a further object of the invention to provide means for counting steps which will operate unobtrusively and which may be used in situations where the wearer wishes to conceal his effort at the measurement of distance.

It is yet another object of the invention to provide a device for the counting of steps which utilizes conventional incremental counters as the recording unit, and which can be made, installed and used with the greatest economy and ease.

SUMMARY OF THE INVENTION

The enumerated objects of the invention, and other objects and advantages which shall become apparent in the detailed description of the preferred embodiment thereof, are attained by providing a mechanical, digital, incremental counter, recessed in the heel of a common walking shoe and actuated by operating lever means secured to the shaft thereof.

The operating lever means, which protrude through a window in the bottom of the heel, are operated on each occasion the heel encounters the solid surface of the walking path, and the window is sealed against the intrusion of water, mud, dust and dirt into the space occupied by the counter proper.

The counter itself forms no part of the instant invention, and may be selected from the many similar types commonly available in commerce, such as the counters manufactured by the Veeder-Root Corporation, or it may be purposefully designed for use in the stepometer of the invention, utilizing the conventional arrangement of side-by-side decade counting wheels.

It is desirable that the counter shall be of the self-resetting type, that is, that it incorporate a bias spring which returns the actuating lever to its neutral position after the recording of each count.

DESCRIPTION OF THE DRAWINGS

The preferred embodiment of the invention will be described in detail, below, with reference to the accompanying drawings, wherein.

DESCRIPTION OF THE PREFERRED EMBODIMENT

Figure 1:
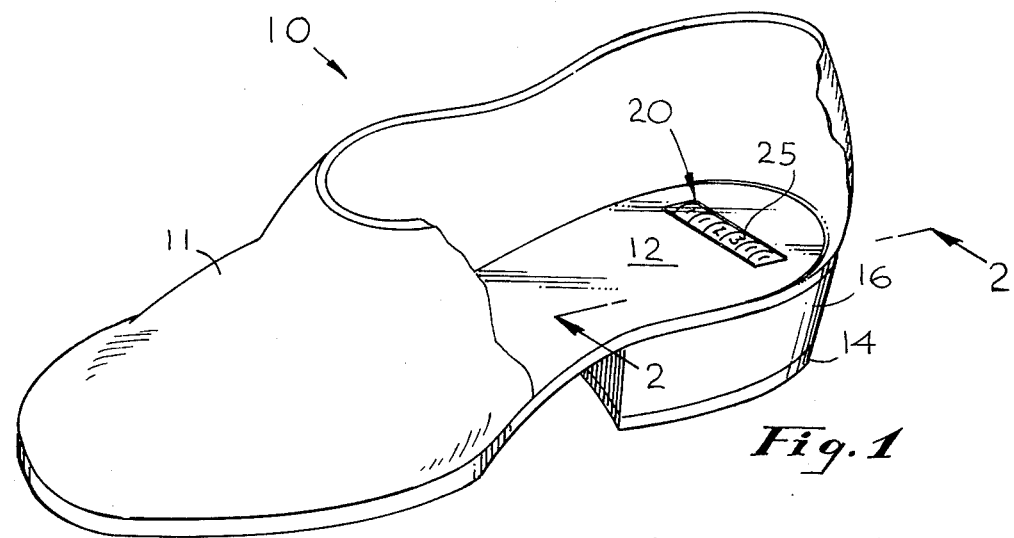
FIG. 1 is a perspective view of a shoe, in a partial section, incorporating a stepometer of the invention.

The perspective view of FIG. 1 shows a shoe assembly 10, with a portion of the sidewall removed for clarity of illustration, equipped with a stepometer of the invention, including a digital counter 20. The counter 20 is a mechanically operated incremental digital counter, which advances the decade wheel representing the least significant digit in a display 25 by unity each time an operating lever 29 — visible in FIGS. 2 and 3 — is moved through a requisite angular displacement.

Internal ratchet and pawl mechanisms in the counter restrict the advance to a single digit and, once the preceeding counting wheel has cycled through nine of its display positions, transfer the motion to the next higher order counting wheel on the succeeding actuation.

The upper face of the counter 20 is inset in the sole 12 of the shoe assembly, so as not to inconvenience the wearer of the shoe, and can be read with the shoe removed from the wearer's foot or the upper face of the counter may be disposed at the surface of, for example, the heel whereby the counter can be read from outside the shoe.

Figure 2:
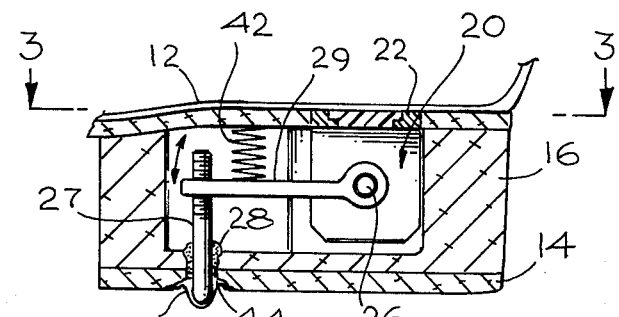
FIG. 2 is a transverse section along line 2₁2 of FIG. 1, showing the actuating mechanism of the counter incorporated therein.
Figure 3:
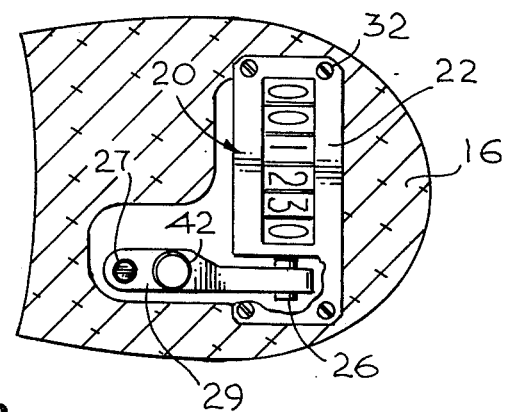
FIG. 3 is a sectional view along line 3—3 of FIG. 2.

The transverse section through the heel portion of the shoe assembly, as illustrated in FIG. 3, indicates the manner in which the counter 20 is inset into the sole 12 and fastened, by means of suitable screws or brads 32, into an upper heel portion 16. The heel of the shoe 10 is conventionally made, with an upper part 16 and lower wearing surface 14. The upper heel 16 is hollowed out to receive the counter 20 and to accomodate its operating lever 29 in its arcuate travel around counter shaft 26. The lever 29 is secured to the shaft 26 by means of a key, by staking thereto, or by the clamp arrangement shown in FIG. 2.

The outboard end of the lever 29 is secured to a pin 27 which projects downwardly and protrudes through a window in the wearing layer 14 of the heel. The pin is, advantageously, threadedly secured to the lever so as to permit height adjustment and facilitate pin replacement. The end portion of the pin is sealed with respect to heel layers 16 and 14 by means of an elastomeric potting composition 28 or by extending a stainless steel diaphragm 40 across the opening of the window in heel layer 14. It is the function of the seal to prevent the intrusion of water and dust into the cavity containing the counter 20, with the sealing of the internal volume of the shoe being accomplished by a mounting flange 22 on the counter itself. As the user's heel strikes the ground, the pin 27 is deflected upwardly and impels the lever 29 into advancing the counter by one digit. When the heel is raised from the surface, the lever arm 29 and pin 27 are returned to the pre-actuating position by means of an expansion spring 42 interposed between the top of the lever arm and the roof of the chamber or by employing a spring biased counter rod.

FIG. 3 shows the same components as recited hereinabove from a view of the upper side of the heel 16, so that the top of the counter is exposed.

The shoe assembly 10 is in all respects a standard piece of footwear, and the style and arrangement of the upper 11 and of the sole 12 are in no way influenced by the installation of the stepometer, which can be undertaken by anyone with some skill in the shoemaking art.

Figure 4:
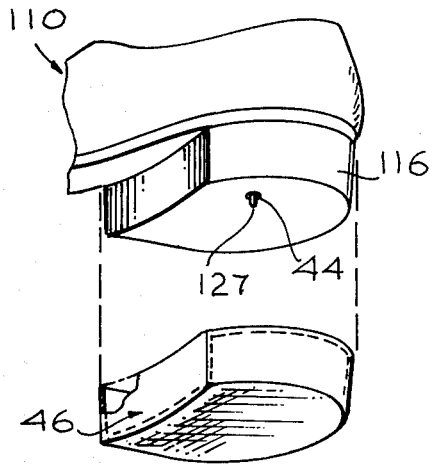
FIG. 4 is a perspective, exploded view of an aternative embodiment of the heel-encompassed stepometer of the invention, using an elastomeric cap for the environmental sealing thereof.

The perspective, exploded view of FIG. 4 shows a shoe 110 equipped with a heel 116 which has a stepometer assembly incorporated therein. The end of the actuating pin 127 extends through a window 44 of the heel. A rubber cover 46, molded to fit closely over the perimeter of the heel 116 is also provided and acts as a seal against any intrusion of road dirt into the hollow portions of the heel.

One advantage of sealing the stepometer by means of an all-enclosing heel cover 46 is the total coverage provided thereby, both in terms of visible evidence of the mounting of a stepometer and in terms of sealing efficiency. The cover 46 provides complete watertightness to the assembly and may be employed on muddy or marshy gound, or in crossing streams.

Figure 5:
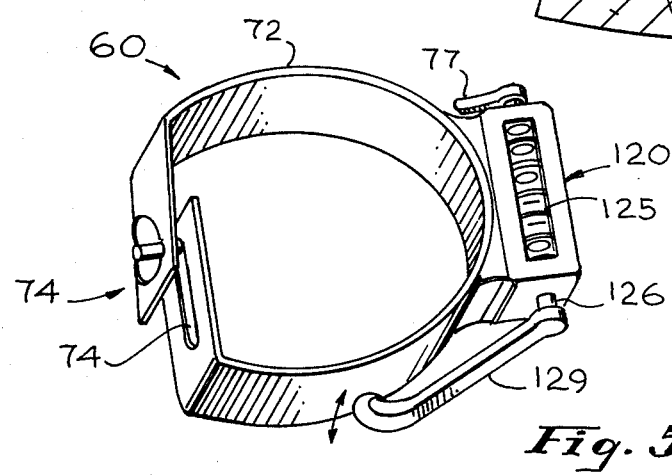
FIG. 5 is a perspective, exploded view of yet another embodiment of the invention, adapted to be secured to the heel of any shoe.

An alternative embodiment of the invention is shown in FIG. 5, adapted to use where the requirement for sealing the unit and for unobtrusiveness are less pronounced. All components of a stepometer assembly 60 are mounted on a frame 72 shaped to fit around a shoe heel, much in the manner of a dismountable spur.

Outriggers of the frame 72 are adapted to locate a digital counter 120 in a position directly behind, and slightly above, the heel of a shoe. A display panel 125 in the counter permits the viewing of the number of steps taken since the beginning of a walk; a reset lever 77 is also provided to permit the return of the counter to a display of all zeros at the beginning of the measured distance.

A thumbscrew and slot assembly 74, 74a is provided in the front segment of the frame 72 and secures the frame to the heel. An actuating lever 129, which is secured to the spring biased shaft 126 of the counter 120, passes along one side of the heel and is biased downwardly below the plane of the heel surface in the normal position between counts. The actuation of the counter 120 occurs by the arcuate lifting of the lever 79 upon the approach of the heel toward the ground.

The principles of operation of the demountable stepometer assembly 60 are the same as those of the integrally mounted embodiment of the invention as illustrated with reference to FIGS. 1 through 3. The convenience of ready attachment to any arbitrary shoe is gained at the cost of greater exposure of the device, both to view and to the elements.

The invention has been described hereinabove to clearly and concisely set forth the construction of its preferred embodiment and of an alternate embodiment. Minor changes in the mechanical arrangement of components, of the method of attachment to a shoe and the materials of construction may become apparent to one skilled in the art, upon exposure to the teachings herein. Such changes are deemed to be encompassed by the disclosure herein and the invention is delimited only by the appended claims.

That which is claimed is:

1. A step-counting shoe comprising:
a shoe member provided with heel means;
said heel means having hollowed portion means;
step-counting means disposed within the hollowed portion means and secured to said heel means;
operating means, reciprocally displaceable between non-counting and counting positions, for actuating said step-counting means;
said operating means being disposed within said hollowed portion means and including pin means extending through an aperture in the base of said heel means in the non-counting position; and
means for biasing said operating means to the non-counting position.

2. The step-counting shoe of claim 1 wherein said step-counting means is a digital incremental counter equipped with an input shaft.

3. The step-counting shoe of claim 2 wherein said operating means includes lever arm means with one end of said lever arm means being secured to said pin means and the other end of said lever arm means being secured to said input shaft with said lever arm means actuating the input shaft to advance the digital counter by a single digit upon inward movement of said pin means to the counting position.

4. The step-counting shoe of claim 3 which includes yieldable sealing means for sealing the aperture in the base of said heel means about said pin means to prevent outside elements from entering said hollowed portion means.

5. The step-counting shoe of claim 3 wherein yieldable cap means enclose the base of said heel means.

6. The step-counting shoe of claim 3 wherein the pin means is releasably and adjustably secured to said lever arm means.

7. The step-counting shoe of claim 3 wherein the means for biasing the operating means to the non-counting position comprises spring means disposed in said hollowed portion means and acting on said lever arm means.

* * * * *